United States Patent [19]

McCullough, Jr. et al.

[11] Patent Number: 4,959,261

[45] Date of Patent: Sep. 25, 1990

[54] FLUORINATED NON-GRAPHITIC CARBONACEOUS FILMS AND FOAMS

[75] Inventors: Francis P. McCullough, Jr.; Leo R. Novak, both of Lake Jackson, Tex.

[73] Assignee: The Dow Chemical Company, Midland, Mich.

[21] Appl. No.: 383,837

[22] Filed: Jul. 21, 1989

[51] Int. Cl.$^5$ .......................... B32B 3/26; B32B 9/00
[52] U.S. Cl. .............................. 428/312.2; 428/318.4; 428/408; 428/421; 428/422
[58] Field of Search ................. 428/312.2, 318.4, 408, 428/421, 422

[56] References Cited

U.S. PATENT DOCUMENTS

| | | |
|---|---|---|
| 4,857,394 | 8/1989 | McCullough, Jr. et al. ........ 428/408 |
| 4,857,404 | 8/1989 | McCullough, Jr. et al. ........ 428/421 |
| 4,902,561 | 2/1990 | McCullough, Jr. et al. ........ 428/408 |

*Primary Examiner*—William J. Van Balen

[57] ABSTRACT

A film or foam structure comprising a non-flammable non-graphitic carbonaceous film or foam having an LOI greater than 40 and at least a partially fluorinated surface.

12 Claims, No Drawings

FLUORINATED NON-GRAPHITIC CARBONACEOUS FILMS AND FOAMS

FIELD OF THE INVENTION

This invention relates to novel non-graphitic carbonaceous films and foams which have been surface treated. More particularly, this invention relates to non-graphitic carbonaceous films and foams having a fluorination treatment of their surface so as to protect them against oxidation. The films of the invention may be utilized as capacitors.

BACKGROUND OF THE INVENTION

It is known that the surface of fibers such as polyolefins, polyamides, polyesters, and polyacrylonitriles fibers can be fluorinated as described in U.S. Pat. Nos. 3,988,491 and 4,020,223.

U.S. Pat. No. 3,988,491, which is herein incorporated by reference, discloses that surface fluorination of polyamides and polyesters produces surface carboxylates. The fluorination is utilized to provide improved wicking.

U.S. Pat. No. 4,296,151 discloses the fluorination of polyolefins and copolymers of conjugated dienes and vinyl aromatic compounds to render the surfaces receptive to adhesion, inks, paints, and the like, by making the surfaces more polar in chemical nature.

U.S. Pat. No. 4,642,664 of Goldberg et al, which is herewith incorporated by reference, discloses the preparation of partially carbonized aromatic polyamides which may be used in the present invention.

U.S. Pat. No. 3,960,770 to Raley Jr., et al, which is herein incorporated by reference discloses a microporous foam which can be made carbonaceous and then treated according to the present invention.

U.S. Pat. application Ser. No. 236,478, filed Aug. 24, 1988, of Mc Cullough et al, which is incorporated herein by reference, discloses a process for fluorinating carbonaceous fibers which may be utilized for preparing the fluorinated films and foams of the invention.

U.S. Patent Application Serial No. 285,141, filed Dec. 16, 1988 of Mc Cullough et al, entitled "CARBONACEOUS FOAMS", which is incorporated herein by reference discloses the preparation of carbonaceous foams which are some of the precursor materials in the present invention.

The fluorinated material of the invention can find use as insulation and coverings for electronic equipment.

The term "stabilized" as used herein applies to films or foams or tows which have been oxidized at a specific temperature, typically less than about 250 degrees Celsius for acrylic films or foams. It will be understood that in some instances the films and/or foams are oxidized by chemical oxidants at lower temperatures.

SUMMARY OF THE INVENTION

The present invention is directed to films and foam products comprising a core of a non-graphitic, non-flammable carbonaceous material derived from stabilized polymeric materials having their surfaces rendered non-electrically conductive and resistant to oxidation by fluorination. The carbonaceous materials of the invention have an LOI greater than 40.

The fluorinated foams and films of the invention are substantially non-staining, non-soiling and non-wetting.

Therefore, it is an object of the invention to provide a carbonaceous film or foam structure which has been subjected to a fluorinated treatment.

It is a further object of the invention to provide a carbonaceous film or foam having an electrically conductive core and a non-electrically conductive surface.

It is a still further object of the invention to provide a carbonaceous foam or fiber having shape-reforming characteristic and an outer surface resistant to nascent oxygen.

DESCRIPTION OF THE PREFERRED EMBODIMENTS

In accordance with one embodiment of the invention, a nongraphitic carbonaceous film or foam can be provided with at least a partially fluorinated surface that forms a non-electrically conductive barrier.

The precursor carbonaceous films or foams have a carbon content of at least 65 percent and an LOI value of greater than 40 when the films or foams are tested according to the test method of ASTM D 2863-77. The test method is also known as "Oxygen Index" or "Limited Oxygen Index" (LOI). With this procedure, the concentration of oxygen in $O_2/N_2$ mixtures is determined at which a vertically mounted specimen is ignited at its upper end and just (barely) continues to burn. The width of the specimen is from 0.65 to 0.3 cm with a length of from 7 to 15 cm. The LOI value is calculated according to the equation:

$$LOI = \frac{[O_2]}{[O_2] + [N_2]} \times 100$$

The foam of the present invention can be flexible, rigid, semi-rigid or semiflexible, open cell, closed cell or reticulated.

The precursor carbonaceous films in the invention may be prepared by using any film-forming process prior to stabilization. The film may be extruded, calendared, cast of the like. The various process for film forming are described in Modern Plastics Encyclopedia, 1984–1985, Mc Graw-Hill Inc., New York, which is herein incorporated by reference.

The films are stabilized or oxidized, partially carbonized in an inert atmosphere to provide a carbonaceous film with a desired electroconductivity, and then fluorinated at least partially on the film surface. The fluorination procedure does not penetrate into the film to any substantial degree so that there is formed a core of carbonaceous material which has not been fluorinated. T h e foams of the present invention can be obtained by the steps of (a) preparing a foamed product of a polymeric material; (b) stabilizing or oxidizing the foamed product; (c) partially carbonizing the stabilized foam in an inert atmosphere at a temperature to provide a carbonaceous foam with a desired electroconductivity; and then (d) fluorinating at least a part of the surface of the carbonaceous foam.

The initial foam of step (a) can be prepared by conventional means such as extrusion, impregnation, autoclave, solution expansion or lost foam casting technique.

The blowing agent for preparing the initial foam materials used in this invention includes those blowing agents which vaporize or otherwise generate a gas under the conditions encountered in the foaming reaction. Materials which boil under such conditions include low boiling halogenated hydrocarbons such as chlorotrifluoromethane, dichlorodifluoromethane, trichlorofluoromethane, HCFC-141B($CH_3\ CCl_2F$), HCFC-142B($CH_3\ CClF_2$), HCFC-123 $CF_3CHCl_2$), HCFC-124($CF_3CHClF$), HFC-134A($CF_3CH_2F$), methylene chloride, chloroform, trichloroethane and the like. Suitable materials which react to form a gas under such conditions include water and the so-called zo-blowing agents. Materials which dehydrate to release gaseous water under such conditions, including for example, magnesium sulfate hept-hydrate, sodium carbonate decahydrate, sodium phosphate dodecahydrate, calcium nitrate tetrahydrate, ammonium carbonate, tetrahydrate and the like are less preferably used as a blowing agent. High surface area particulate solids are also useful blowing agents, as described in U.S. Pat. No. 3,753,933. Preferred are $CO_2$, $N_2$, water, halogenated hydrocarbons and mixtures thereof.

A sufficient amount of the blowing agent is used to provide a cellular structure to the polymer. Preferably, sufficient blowing agent is used to provide the polymer with a density from about 0.25 to about 12, more preferably about 0.4–1.0 pounds per cubic foot.

The initial foam is then stabilized or oxidized by placing the foam in a preheated furnace at a temperature between 150 degrees Celsius and 525 degrees Celsius, preferably less than 250 degrees Celsius when the foam is acrylic as described in application Ser. No. 285,141.

The carbonaceous films or foams are prepared by heat treating a suitable stabilized precursor film or foam material which can be made into a carbonaceous film or foam and which is non-graphitic and thermally stable. Suitable precursor materials may be, for example, derived from a stabilized polymeric material or stabilized pitch (petroleum or coal tar) based materials. Preferably, the precursor stabilized material used in the present invention is derived from acrylic based materials, aromatic polyamids, polyvinyl chloride, polybenzinidazole, and the like.

The heat treatment to form the carbonaceous film or foam is performed in an inert atmosphere at an elevated temperature for a period of time to produce a heat induced thermoset reaction wherein additional crosslinking and/or chain cyclization reactions occur between the original polymer chain.

The carbonaceous films or foams which are utilized to prepare the structure of the invention and form the inner core may be classified into three groups depending upon the degree of heat treatment.

A first group of non-graphitic carbonaceous foams and films that are thus produced and form the inner core can be classified as being electrically nonconductive and possess no antistatic characteristics, i.e., they do not have the ability to dissipate an electrostatic charge.

The term electrically nonconductive as utilized in the present invention relates to carbonaceous foams having a resistance of greater than $10^6$ ohm cm.

When the carbonaceous foam or film is an acrylic foam or film it has been found that a nitrogen content of about 20 percent or more results in a nonconductive film or foam.

In a second group, the carbonaceous films or foams are classified as being partially electrically conductive (i.e., having low conductivity), having static dissipating characteristics and having a carbon content of less than 85 percent. Low conductivity means that the film or foam has a specific resistance of from $10^6$ to $10^3$ ohm cm. Preferably, the carbonaceous films or foams are derived from stabilized acrylic materials and possess a percentage nitrogen content of from 10 to 20 percent for the case of a copolymer acrylic film or foam, more preferably from about 18 to 20 percent.

The second group of carbonaceous materials when composed of an acrylic polymer are preferably obtained by heat treating at a temperature between about 325 to 750 degrees.

In a third group are films or foams having a carbon content of at least 85 percent. These films and foams are characterized as being highly electrically conductive. That is, the specific resistivity is less than $10^{-1}$ ohm cm and they are useful in applications where electrical grounding or shielding are also desired. The third group of carbonaceous films or foams are preferably obtained by heat treating at a temperature above about 750 degrees Celsius but at a temperature to avoid complete carbonization.

It is understood that the time period of heat treatment is also a factor to be considered. The time period is determined upon such factors as size of film or foam, the specific polymer, etc.

The precursor acrylic materials which are advantageously utilized in preparing the films or foams of the invention are selected from the group consisting of acrylonitrile homopolymers, acrylonitrile copolymers and acrylonitrile terpolymers. The copolymers preferably contain at least about 85 mole percent of acrylonitrile units and up to 15 mole percent of one or more monovinyl units copolymerized with styrene, methylacrylate, methyl methacrylate, vinyl chloride, vinylidene chloride, vinyl pyridine, and the like. Also, the acrylic materials may comprise terpolymers, preferably, wherein the acrylonitrile units are at least about 85 mole percent. Advantageously, there is retained a nitrogen content of at least about 5 percent.

The carbonaceous aromatic polyamide films and foams which may be utilized in the fluorination treatment according to the invention may be prepared according to the process described in tee aforementioned U.S. Pat. No. 4,642,664. Among the precursor aromatic polyamide polymers which may be used in the invention there may be mentioned poly(p-phenylene terephthalamide), (2,7(phenanthidone)terephthalamide), poly(paraphenylene-2,6naphthalamide), poly(methyl-1,4-phenylene)terephthalamide, and poly(chloro-1,4-phenylene)terephthalamide. Additional specific examples of wholly aromatic polyamides are disclosed by P.W. Morgan in Macromolecules, Vol. 10, No. 6, pp. 1381–90 (1977), which is herein incorporated by reference in its entirety.

The surface of the carbonaceous films or foams are fluorinated by any well known techniques such as described in U.S. Pat. Nos. 3,988,491 and 4,020,223.

In carrying out the fluorination process of the present invention, the carbonaceous films or foams produced in accordance with the procedure outlined above are placed in a conventional reaction vessel. The reaction vessel is evacuated and fluorine gas preferably in an inert carrier gas is passed into the reactor to contact the carbonaceous material. When the reaction is complete the carbonaceous fibers are removed, washed with distilled water and dried. Treatment conditions are of course selected taking into account size, type of material, etc.

In one embodiment of the invention, the temperature of the fluorination reaction is at ambient temperature.

The amount of fluorine used is from about 0.1 to about 2.5 moles of fluorine per mole of carbon and typically about 1 mole fluorine per mole of carbon. The percent of fluorine in the inert gas used is from about 1 to about 75 percent and typically about 20 percent of fluorine. The reaction time may take from about 5 minutes to about 1 hour and typically about 1 hour. However, it is understood that the reaction time will depend upon the size and type of carbonaceous material utilized.

It is understood that all percentages as herein utilized are based on weight percent.

Exemplary of the present invention are set forth in the following examples:

EXAMPLE 1

In the following example, a plurality of precursor foams are prepared under varying conditions, using the extrusion impregnation method. In each case, the polymer is heat plastified in an extruder substantially in the manner of U.S. Pat. Nos. 2,669,751 and 3,770,668, which are herein incorporated by reference, and a volatile fluid blowing agent is injected into the heat plastified polymer stream. From the extruder the heat plastified gel is passed into a mixer, the mixer being a rotary mixer wherein a studded rotor is enclosed within a housing which has a studded internal surface which intermeshes with the studs on the rotor. The heat plastified gel from the extruder is fed into the end of the mixer and discharged from the remaining end, the flow being in a generally axial direction. From the mixer, the gel passes through coolers such as are described in U.S. Pat. No. 2,669,751 and from the coolers to a die which extrudes a generally rectangular board.

A. A heat plastified polyacrylonitrile stream is fed to the extruder at the rate of 541 parts by weight per hour. The blowing agent consists of a 1:1 by weight mixture of methyl chloride and dichlorodifluoromethane which is injected into the heat plastified polymer prior to its entry to the mixer. The intermeshing studs of the mixer have a relative velocity of 100 feet per minute. A total feed of $20.3 \times 10^{-4}$ moles of blowing agent per gram of polymer is employed. 0.06 part of indigo per 100 parts of polymer is added as a nucleator. A stable rectangular board is extruded at a temperature of 121.5 degrees Celsius having a cross-sectional dimension of $2.25 \times 24$ inches and an average cell diameter of 0.4 millimeter.

B. The foam from part A was stabilized by heating in an oven at 175 degrees Celsius for 20 minutes.

C. A series of runs were made to determine the effect various heat treatment temperatures had on the stabilized foams of step B. A significant property was the specific resistivity of the foams. Each of the specimens measured $1'' \times 6'' \times 6''$ (2.54 cm $\times$ 15.24 cm $\times$ 15.24 cm). The stabilized foams were partially carbonized by placing them in an oxygen free nitrogen pad in an incremental quartz-tube furnace. The temperature of the furnace was gradually increased from room temperature to about 550 degrees Celsius over a three hour period with the higher temperatures being achieved by 50 degrees Celsius increments every 10–15 minutes. The materials were held at the desired temperature for about 1 hour, the furnace opened and allowed to cool while purging with argon.

The specific resistivity of the carbonaceous foams was calculated from measurements made on selected samples. The results are set forth in the following table:

| Sample | Final Temp. in Degrees Celsius | Log Specific Resistivity Measured in ohm cm |
|---|---|---|
| 1 | 550 | 5.8 |
| 2 | 600 | 3.0 |
| 3 | 650 | 0 |
| 4 | 750 | .3 |
| 5 | 850 | −1.0 |

D. Each of the samples from step C was placed in a monel reaction vessel. The reaction vessel was evacuated and fluorine gas diluted with helium was allowed to flow into the reaction vessel. The amount of fluorine used was from about 0.1 to 2.5 moles of fluorine per mole of carbon and typically about 1 mole of fluorine per mole of carbon. The percent fluorine in the helium used was about 1 to 75 percent and typically about 20 percent fluorine. The reaction time was about 5 minutes to 1 hour and typically about 1 hour.

The specific resistivity of the surface of the samples was measured and the surfaces of each sample was substantially nonconductive. The samples were cut at the ends and the specific resistivity of the core of the samples was measured. the specific resistivity of the core remained the same.

In lieu of carbonaceous foam, a film of carbonaceous material can be fluorinated in a similar manner.

EXAMPLE 2

A stabilized film of KEVLAR (0.5 in. $\times$ 6 in. $\times$ 6 in.) was heat treated for 20 minutes at 425 degrees Celsius and then placed in a dilute fluorine stream reactor as described in Example 1 for 15 minutes. This reaction placed an electrically non-conductive coating about the film's surfaces.

What is claimed is:

1. A film or foam structure comprising a non-flammable nongraphitic carbonaceous film or foam having an LOI greater than 40 and at least a partially fluorinated surface.

2. The structure of claim 1 which is a film.

3. The structure of claim 1 which is a foam.

4. The structure of claim 1 wherein the entire surface is fluorinated.

5. The structure of claim 1 wherein said carbonaceous film or foam is electrically non-conductive.

6. The structure of claim 1 wherein said carbonaceous film or foam has static dissipating characteristics.

7. The structure of claim 1 wherein said carbonaceous film or foam is electrically conductive.

8. The structure of claim 1 wherein said carbonaceous film or foam is derived from stabilized polyacrylonitrile.

9. The structure of claim 1 wherein said carbonaceous film or foam is derived from a stabilized polyamide.

10. The structure of claim 1 wherein said carbonaceous film or foam has a nitrogen content of from about 10 to 20 percent.

11. The structure of claim 10 wherein said carbonaceous film or foam has a nitrogen content of about 18 to 20 percent.

12. The structure of claim 1 wherein said carbonaceous film or foam has a nitrogen content of at least about 5 percent.

* * * * *